July 21, 1970 R. E. SCHOENEMAN 3,521,296

SKEW COMPENSATION FOR INCREMENTAL MAGNETIC TAPE TRANSPORT

Filed Oct. 19, 1967 2 Sheets-Sheet 1

INVENTOR
ROBERT E. SCHOENEMAN
BY Laurence J. Marhoefer
ATTORNEY

INVENTOR
ROBERT E. SCHOENEMAN
BY
Laurence J. Marhoefer
ATTORNEY

United States Patent Office 3,521,296

Patented July 21, 1970

3,521,296

SKEW COMPENSATION FOR INCREMENTAL MAGNETIC TAPE TRANSPORT

Robert E. Schoeneman, East Setauket, N.Y., assignor to Potter Instrument Company, Inc., Plainview, N.Y., a corporation of New York Filed Oct. 19, 1967, Ser. No. 676,438

Int. Cl. G11b *15/12*

U.S. Cl. 346—74 3 Claims

ABSTRACT OF THE DISCLOSURE

In this incremental tape transport, a tone wheel is coupled to the capstan. Two or more sensors are used in combination with the tone wheel to generate pulses which are phase displaced and which are used respectively to clock information in various channels in order to compensate for static skew.

BACKGROUND OF THE INVENTION

This invention relates to an incremental tape transport and, more particularly, to a simplified system for compensating for misalignment between the recording head and the tape path in such transports.

Ideally, in recording a single character in parallel tracks on a magnetic tape, the recorded information bits which comprise the character are aligned perpendicularly to the longitudinal axis of the tape. However, as a practical matter, it is quite difficult to accurately align a recording head with respect to the tape. Any misalignment results in so-called static skew; that is, the information is recorded at an angle with respect to the tape axis. Additionally, static skew may be caused by slightly misplacing the individual transducers in the recording head.

A number of schemes have been proposed in the prior art to correct or compensate for this so-called static skew. These include attempts to mechanically align the head precisely with respect to the tape path, and schemes which attempt to compensate for the skew electronically. Included among the latter are systems which delay the signals in each track with respect to one another.

Although these prior art schemes are generally satisfactory, it is an object of this invention to provide a particularly simple, inexpensive system for incremental transports which employ a tone wheel for positioning the recorded information on the tape.

SUMMARY OF THE INVENTION

Briefly, in accordance with this invention an incremental encoder coupled to the capstan, which gates the input data in recording to accurately position it on the tape, has several transducers whose outputs are phase displaced slightly one from the other. The output of each transducer is used to gate one track (or a group of tracks) to the end that the information recorded in adjacent tracks is delayed by an amount sufficient to compensate for the static skew.

Having briefly described this invention, it will be described in greater detail along with other objects and advantages in the following detailed description of a preferred embodiment which may be best understood by reference in the accompanying drawings which form part of the instant specification and which are to be read in conjunction therewith and which like reference numerals are used to indicate like parts in the various views.

DESCRIPTION OF THE PREFERRED EMBODIMENTS

Figure 1:
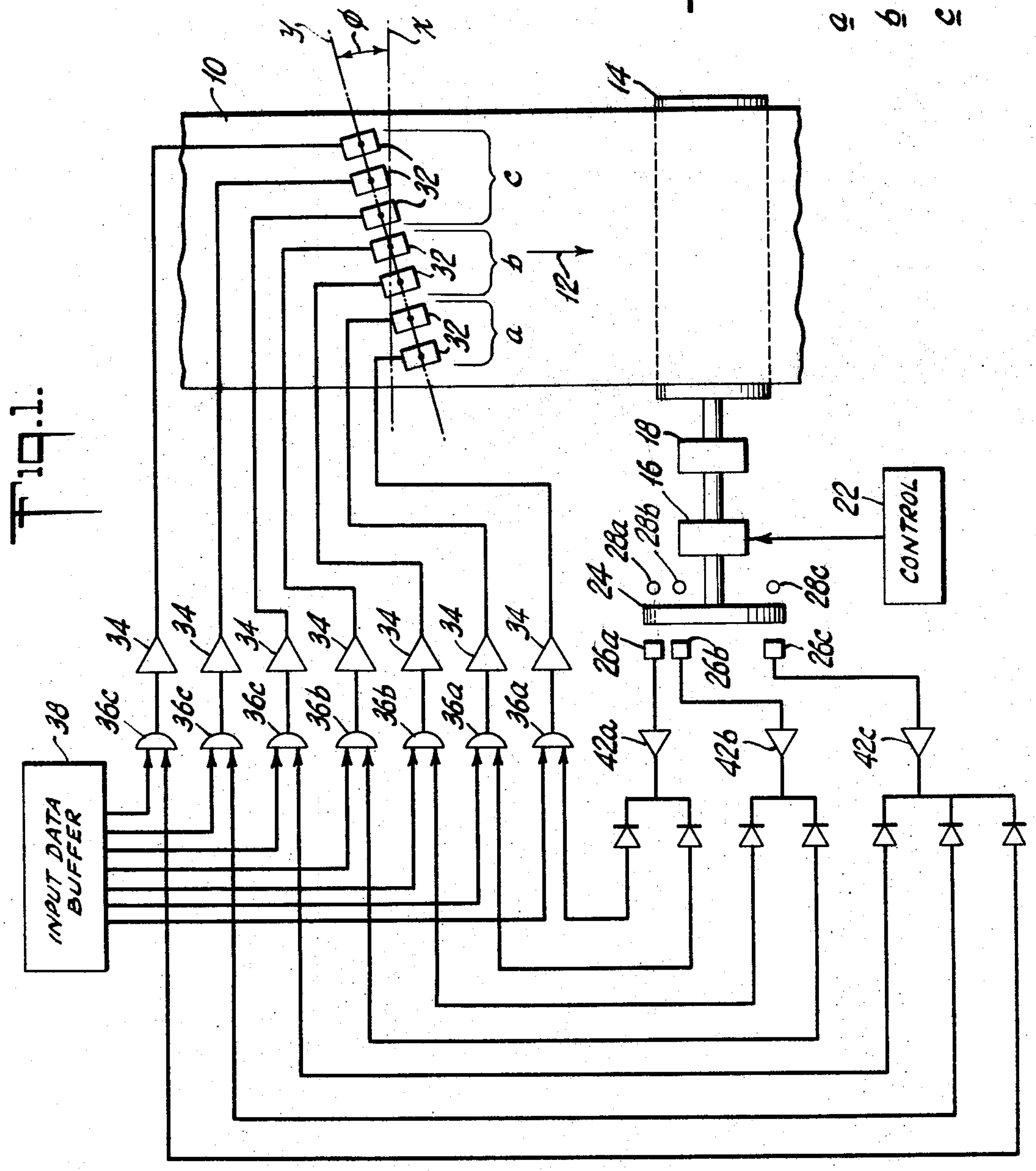
FIG. 1 is a partial block diagram of an incremental tape transport constructed in accordance with the teachings of this invention.

Referring now to FIG. 1, a capstan 14 drives a magnetic tape 10 in the direction of an arrow 12. A stepper motor 16 is coupled by a speed reducing mechanism 18 known to those skilled in the art to the capstan 14. A control circuit 22 causes the motor 16 to rotate the capstan 14 through equal increments upon command.

An angular shaft displacement or incremental encoder is also coupled to the shaft of motor 16 and rotates synchronously with the capstan 14. This encoder may comprise conveniently a translucent disc 24 ruled with equally spaced opaque radial lines and photocells **26*a*, 26*b* and 26*c* positioned so that they are phase displaced from one another. Light sources 28*a*, 28*b* and 28*c*, respectively, illuminate the transducers 26*a*, 26*b* and 26*c***.

Disposed over the tape 10 are seven (for example) recording transducers 32. Ideally, the gaps of these transducers 32 would be aligned along line $x$; however, it should be noted that they are in fact aligned along line $y$, which takes an angle $\phi$ with line $x$. It should be noted that to correct for the skew shown completely, individual compensation should be provided for each track. However, it has been found that as a practical matter, it is usually satisfactory to treat two or more adjacent tracks as a group; such a system is shown in the preferred embodiment of FIG. 1.

Each transducer 32 is driven by an amplifier 34, whose input is coupled to the output of an AND gate 36. One input to each of the gates 36 is from an input data buffer 38 and the other input of each is from one of the transducers **26*a*, 26*b* or 26*c*. As will be appreciated by those skilled in the art, with the circuit of FIG. 1, information will be recorded in a particular channel coincidentally with the generation of a pulse from transducer 26*a*, 26*b* or 26*c***, respectively.

Amplifiers **42*a*, 42*b* and 42*c* amplify and shape the outputs of transducers 26*a*, 26*b* and 26*c***, as is conventional in the art.

Figure 2:
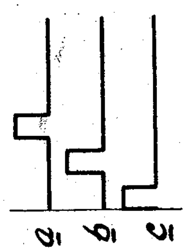
FIG. 2 is a timing diagram showing a typical output for an encoder.
Figure 3:
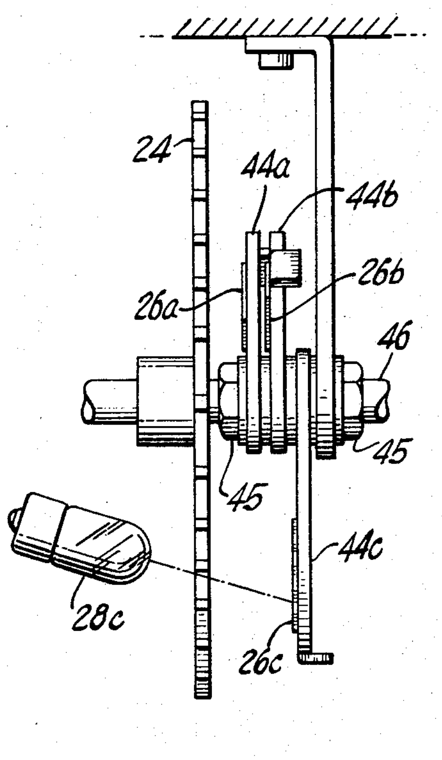
FIG. 3 is a detailed side view of an incremental encoder which may be employed in the practice of this invention.
Figure 4:
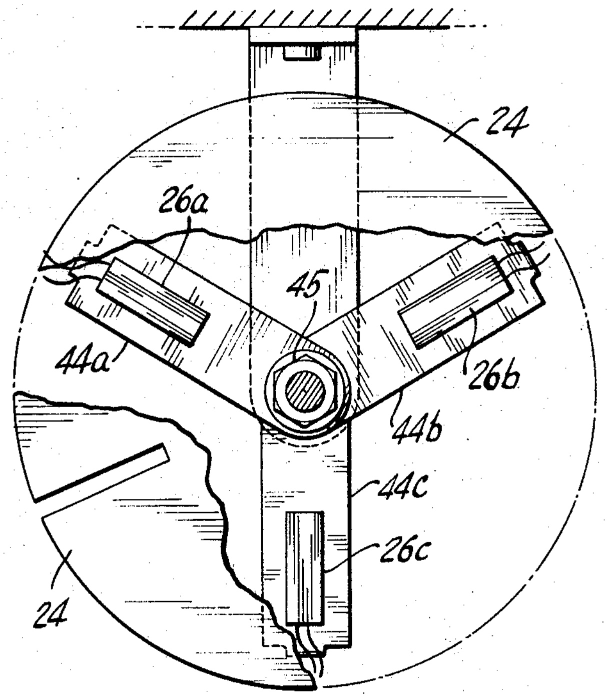
FIG. 4 is a detailed front view of the incremental encoder of FIG. 3.

Referring now to FIGS. 3 and 4 in addition to FIG. 1, the photocells **26*a*, 26*b* and 26*c* are mounted on arms 44*a*, 44*b* and 44*c*. These arms are rotatably mounted on a shaft 46 about which the disc 24 also rotates and may be locked in place by a nut 45. By simply adjusting the relative positions of arms 44*a*, 44*b* and 44*c*, the outputs of photocells 26*a*, 26*b* and 26*c* can be given any desired relative phase relationship. For example, to compensate for the skew shown in FIG. 1, the relative phases of the photocell outputs would be approximately that shown in FIG. 2 wherein the output of photocell 26*a* precedes the output of photocell 26*b* which in turn precedes that of photocell 26*c*** for each incremental rotation of the capstan. It will be appreciated that phase displacement required will vary from transport to transport. Conveniently, test data may be recorded and checked in order to assist in obtaining the correct relative phase relationship among the transducers.

In operation, as the motor 16 advances the tape incrementally in the direction of the arrow 12, the input data from source 38 is coupled to the recording heads bracketed by the letter *a* each time a pulse is generated by photocell **26*a*; to the recording heads 32** bracketed by the letter *b* each time a pulse is received from a photocell **26*b***; and to the three heads bracketed by the letter *c* each time a photocell 26c produces a pulse. Thusly, in recording a character in parallel across the tape, the two heads bracketed by the letter *a* are first recorded. After the tape has advanced a slight additional distance, photocell 26b produces a pulse and the heads bracketed by *b* record. Similarly, after another slight advance of the tape, the three heads bracketed by the letter *c* record. It will be appreciated that the recorded character bits will be aligned approximately with the line *x*. As previously explained, a separate photocell may be employed for each track for more precise alignment, but for many applications, a single photocell may be sufficient to compensate for the skew in two or three tracks.

Thus, it will be appreciated that the object of this invention has been accomplished. The three transducers whose relative phase may be varied provides a simple and inexpensive system for correcting for recording head skew in an incremental encoder.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. A system for compensating for static skew in a magnetic tape transport, comprising, in combination:

a plurality of magnetic transducers, means for disposing said transducers adjacent a magnetic tape path, a capstan for driving a magnetic tape past said transducers, a tone wheel, means for coupling said tone wheel to said capstan to rotate said tone wheel as said capstan rotates, a plurality of sensors for producing an output signal upon rotation of said tone wheel through a predetermined angle, means for positioning said plurality of sensors with respect to said tone wheel so that their respective output signals are relatively phase displaced, means for storing data, a plurality of gate circuits each having at least two inputs and one output, means for coupling said data storage means as one input to each of said gate circuits, means for coupling respective ones of said magnetic transducers as one output to respective ones of said gate circuits, and means for coupling respective ones of said sensor outputs as the other input to respective ones of said gates whereby the output signals of said gate circuits respectively are delayed relative to one another by the amount of phase displacement of said sensor signals to compensate for static skew among said transducers.

2. A system for compensating for static skew as in claim 1 wherein said means for positioning said plurality of sensors includes a plurality of arms each of which is capable of independent movement.

3. A system for compensating for static skew as in claim 2 wherein said sensors are photosensors and said tone wheel is a disc having alternate translucent and opaque sections.

References Cited

UNITED STATES PATENTS

| | | | |
|---|---|---|---|
| 2,851,676 | 9/1958 | Woodcock et al. | 340—174.1 |
| 2,854,526 | 9/1958 | Morgan | 340—174.1 |
| 2,907,621 | 10/1959 | Eisler et al. | 340—174.1 |
| 3,070,800 | 12/1962 | Brown et al. | 340—174.1 |

BERNARD KONICK, Primary Examiner

W. F. WHITE, Assistant Examiner

U.S. Cl. X.R.

340—174.1